(12) United States Patent
Krishnan et al.

(10) Patent No.: US 7,978,710 B2
(45) Date of Patent: Jul. 12, 2011

(54) SYNCHRONOUS INTER-PICONET ROUTING

(75) Inventors: Ranganathan Krishnan, San Diego, CA (US); Sanjiv Nanda, Ramona, CA (US)

(73) Assignee: Qualcomm Incorporated, San Diego, CA (US)

(*) Notice: Subject to any disclaimer, the term of this patent is extended or adjusted under 35 U.S.C. 154(b) by 2434 days.

(21) Appl. No.: 10/810,457

(22) Filed: Mar. 26, 2004

(65) Prior Publication Data
US 2005/0213550 A1    Sep. 29, 2005

(51) Int. Cl.
*H04L 12/28* (2006.01)
(52) U.S. Cl. ............ 370/395.4; 370/254; 370/332
(58) Field of Classification Search .......... 370/332, 370/338; 455/443, 522
See application file for complete search history.

(56) References Cited

U.S. PATENT DOCUMENTS

| | | | |
|---|---|---|---|
| 5,920,817 A * | 7/1999 | Umeda et al. | 455/437 |
| 6,072,990 A * | 6/2000 | Agrawal et al. | 455/69 |
| 6,831,904 B1 * | 12/2004 | Yamao et al. | 370/331 |
| 6,834,192 B1 * | 12/2004 | Watanabe et al. | 455/444 |
| 7,184,767 B2 * | 2/2007 | Gandolfo | 455/435.2 |
| 2002/0115409 A1 * | 8/2002 | Khayrallah | 455/41 |
| 2003/0031208 A1 | 2/2003 | Anshem et al. | |
| 2003/0083015 A1 * | 5/2003 | Palin et al. | 455/67.1 |
| 2003/0125066 A1 | 7/2003 | Habetha | |
| 2003/0161268 A1 | 8/2003 | Larsson et al. | |
| 2004/0009784 A1 * | 1/2004 | Ohkubo et al. | 455/522 |
| 2006/0183423 A1 * | 8/2006 | Johansson et al. | 455/41.2 |
| 2006/0280143 A1 * | 12/2006 | Dabak et al. | 370/329 |
| 2007/0117582 A1 * | 5/2007 | Ohkubo et al. | 455/522 |
| 2007/0183346 A1 * | 8/2007 | Thubert et al. | 370/254 |

FOREIGN PATENT DOCUMENTS

| | | |
|---|---|---|
| WO | 03047176 | 6/2003 |
| WO | 2004023668 | 3/2004 |

OTHER PUBLICATIONS

Sun et al., "Interference-Aware MAC Scheduling and SAR Policies for Bluetooth Scatternets," IEEE, XP-010635904, Nov. 17-21, 2002.

* cited by examiner

*Primary Examiner* — Ayaz R Sheikh
*Assistant Examiner* — Mounir Moutaouakil
(74) *Attorney, Agent, or Firm* — Turocy & Watson, LLP

(57) ABSTRACT

Systems and techniques are disclosed relating to wireless communications. The systems and techniques involve wireless communications wherein a process, module or communications terminal schedules communications. The scheduling function may include scheduling an inter-piconet transmission between first transmitting and receiving terminals including scheduling a power level for the inter-piconet transmission that satisfies a target quality parameter at the first receiving terminal. The scheduling function may also include scheduling an intra-piconet transmission between second transmitting and receiving terminals, including scheduling a power level for the intra-piconet transmission that satisfies a target quality parameter at the second receiving terminal. The intra-piconet transmission may be scheduled simultaneous with the inter-piconet transmission.

25 Claims, 8 Drawing Sheets

SYNCHRONOUS INTER-PICONET ROUTING

BACKGROUND

1. Field

The present disclosure relates generally to wireless communications, and more specifically, to various systems and techniques to schedule direct and multi-hop transmissions within a network.

2. Background

In conventional wireless communications, an access network is generally employed to support communications for a number of mobile devices. These access networks are typically implemented with multiple fixed site base stations dispersed throughout a geographic region. The geographic region is generally subdivided into smaller regions known as cells. Each base station may be configured to serve all mobile devices in its respective cell. As a result, the access network may not be easily reconfigured to account for varying traffic demands across different cellular regions.

In contrast to the conventional access network, ad-hoc networks are dynamic. An ad-hoc network may be formed when a number of wireless communication devices, often referred to as terminals, decide to join together to form a network. Since terminals in ad-hoc networks operate as both hosts and routers, the network may be easily reconfigured to meet existing traffic demands in a more efficient fashion. Moreover, ad-hoc networks do not require the infrastructure required by conventional access networks, making ad-hoc networks an attractive choice for the future.

A completely ad-hoc network consisting of peer-to-peer connections generally results in very inefficient communications. To improve efficiency, the terminals may organize themselves into a collection of piconets. A "piconet" is a group of terminals in close proximity to one another. Each piconet may have a master terminal that schedules transmissions within its own piconet.

Numerous multiple access techniques exist to support communications in an ad-hoc network. A Frequency Division Multiple Access (FDMA) scheme, by way of example, is a very common technique. FDMA typically involves allocating distinct portions of the total bandwidth to individual communications between two terminals in the piconet. While this scheme may be effective for uninterrupted communications, better utilization of the total bandwidth may be achieved when such constant, uninterrupted communication is not required.

Other multiple access schemes include Time Division Multiple Access (TDMA). These TDMA schemes may be particularly effective in allocating limited bandwidth among a number of terminals which do not require uninterrupted communications. TDMA schemes typically dedicate the entire bandwidth to each communication channel between two terminals at designated time intervals.

Code Division Multiple Access (CDMA) techniques may be used in conjunction with TDMA to support multiple transmissions during each time interval. This may be achieved by transmitting each signal in a designated time interval with a different code that modulates a carrier, and thereby, spreads the signal. The transmitted signals may be separated in the receiver terminal by a demodulator that uses a corresponding code to de-spread the desired signal. The undesired signals, whose codes do not match, are not de-spread and contribute only to noise.

In TDMA systems that use spread-spectrum communications, each master terminal may schedule transmissions within its own piconet in a way that does not cause excessive mutual interference. However, it may be more difficult to manage interference from transmissions across multiple piconets. Accordingly, a robust and efficient scheduling algorithm is needed. The scheduling algorithm may be used to schedule direct and multi-hop transmissions across multiple piconets in a way that does not cause excessive interference.

SUMMARY

In one aspect of the present invention, a method of scheduling communications includes scheduling an inter-piconet transmission between first transmitting and receiving terminals including scheduling a power level for the inter-piconet transmission that satisfies a target quality parameter at the first receiving terminal, and scheduling an intra-piconet transmission between second transmitting and receiving terminals, including scheduling a power level for the intra-piconet transmission that satisfies a target quality parameter at the second receiving terminal. The intra-piconet transmission being scheduled simultaneous with the inter-piconet transmission. The method may be performed by a scheduler operating in a communications terminal or by any other means.

In another aspect of the present invention, a method of scheduling communications includes receiving in a first piconet information relating to a scheduled inter-piconet transmission from a second piconet, and scheduling a plurality of intra-piconet transmissions in the first piconet with no intra-piconet transmissions being scheduled simultaneously with the inter-piconet transmission. The method may be performed by a scheduler operating in a communications terminal or by any other means.

In yet another aspect of the present invention, a method of scheduling communications includes receiving in a first piconet timing information relating to a scheduled inter-piconet transmission from a first transmitting terminal in a second piconet to a first receiving terminal in the first piconet. The method further includes scheduling an intra-piconet transmission between second transmitting and receiving terminals in the first piconet simultaneously with the inter-piconet transmission, scheduling a power level for the inter-piconet transmission that satisfies a target quality parameter at the first receiving terminal, and scheduling a power level for the intra-piconet transmission that satisfies a target quality parameter at the second receiving terminal.

In a further aspect of the present invention, a communications terminal includes means for scheduling an inter-piconet transmission between first transmitting and receiving terminals including scheduling a power level for the inter-piconet transmission that satisfies a target quality parameter at the first receiving terminal, and means for scheduling an intra-piconet transmission between second transmitting and receiving terminals, including scheduling a power level for the intra-piconet transmission that satisfies a target quality parameter at the second receiving terminal, the intra-piconet transmission being scheduled simultaneous with the inter-piconet transmission.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention.

In the following detailed description, various aspects of the present invention may be described in the context of an Ultra Wide Band (UWB) wireless communications system. While these inventive aspects may be well suited for use with this application, those skilled in the art will readily appreciate that these inventive aspects are likewise applicable for use in various other communication environments. Accordingly, any reference to a UWB communications system is intended only to illustrate the inventive aspects, with the understanding that such inventive aspects have a wide range of applications.

Figure 1:
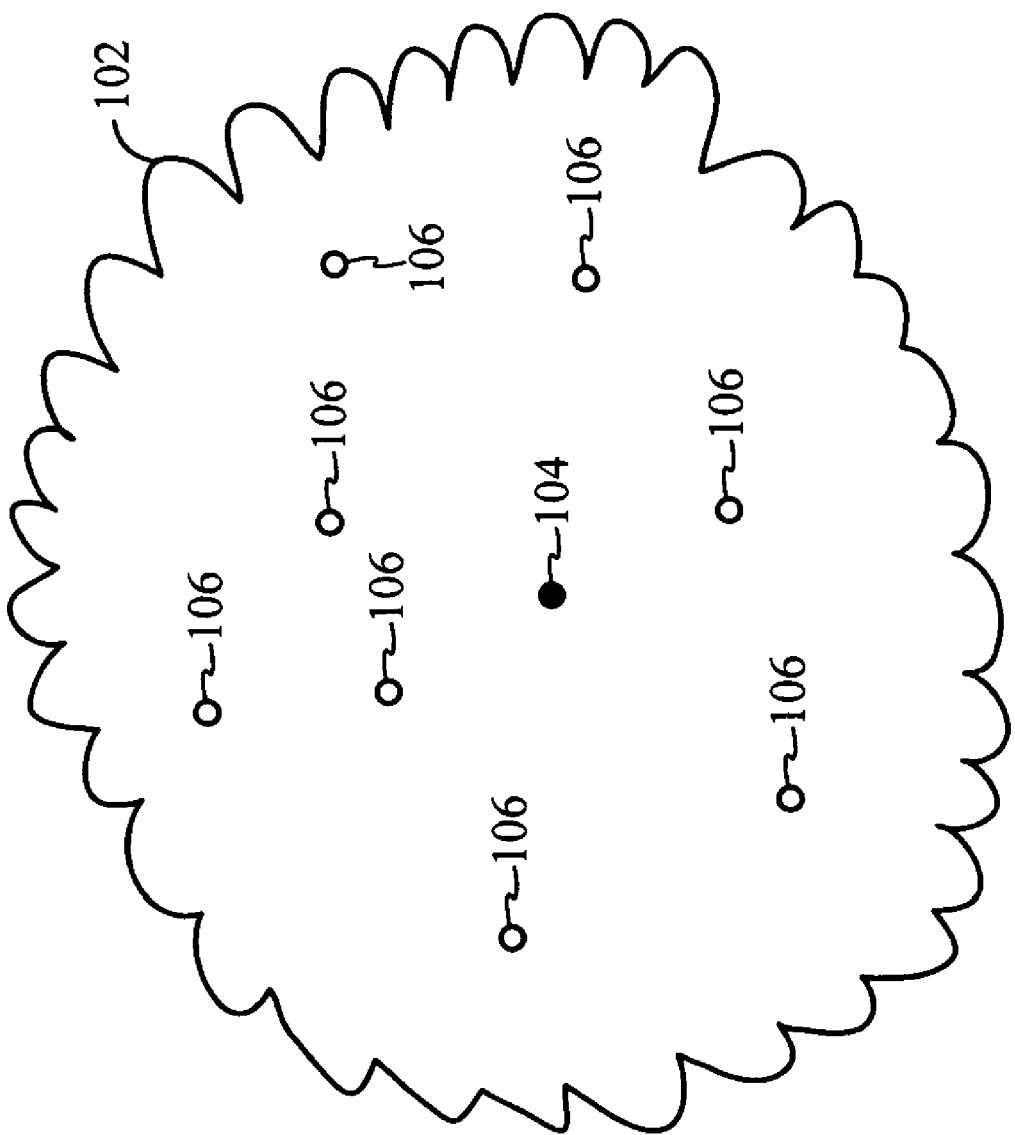
FIG. 1 is a conceptual diagram illustrating an example of a piconet.

FIG. 1 illustrates an example of a network topology for a piconet in a wireless communications system. A piconet 102 is shown with a master terminal 104 supporting communications between several member terminals 106. The terminals may be stationary or in motion, such as a terminal that is being carried by a user on foot or in a vehicle, aircraft, ship, or the like. The term "terminal" is intended to encompass any type of mobile communications device including cellular or wireless phones, personal data assistants (PDA), laptops, external or internal modems, PC cards, or any other similar devices. Within the piconet 102, the master terminal 104 may be able to communicate with each of the member terminals 106. The member terminals 106 may also be able to directly communicate with one another under control of the master terminal 104. As to be explained in greater detail below, each member terminal 106 in the piconet 102 may also be able to directly communicate with terminals outside the piconet.

The master terminal 104 may communicate with the member terminals 106 using a multiple access scheme, such as TDMA, FDMA, CDMA, or another multiple access scheme. To illustrate the various aspects of the present invention, the wireless networks described throughout this disclosure will be in the context of a hybrid multiple access scheme employing both TDMA and CDMA technologies. Those skilled in the art will readily understand that the present invention is in no way limited to such multiple access schemes.

A piconet may be formed in a variety of ways. By way of example, when a terminal initially powers up, it may search for pilot signals from various piconet master terminals. The pilot signal broadcast from each piconet master terminal may be an unmodulated spread-spectrum signal, or another type of reference signal. In spread-spectrum communications, a psuedo-random noise (PN) code unique to each piconet master terminal may be used to spread the pilot signal. Using a correlation process, the terminal may search through all possible PN codes to locate a pilot signal from a master terminal, such as the pilot signal broadcast from the master terminal 104 in FIG. 1. The pilot signal may be used by the member terminal 106 to synchronize to the master terminal 104. The acquisition of a spread spectrum pilot signal is well known in the art.

The master terminal 104 may be used to manage high data rate transmissions. This may be achieved by allowing only those terminals that can support a minimum or threshold data rate with the master terminal 104 to join the piconet 102. In UWB communication systems, for example, a data rate of 1.2288 Mbps may be supported at a distance of 30-100 meters depending on the propagation conditions. In these systems, the master terminal 104 may be configured to organize the piconet 102 with member terminals 106 that can support a data rate of at least 1.2288 Mbps. If higher data rates are desired, the range may be further restricted. By way of example, data rates of 100 Mbps may be achieved in UWB systems at a range of 10 meters.

The member terminal 106 may be configured to determine whether it can satisfy the minimum data rate requirements of the piconet by measuring the link quality using the pilot signal broadcast from the master terminal 104. As discussed in greater detail above, a terminal may identify a pilot signal through a correlation process. The link quality may then be measured by computing the carrier-to-interference (C/I) ratio from the pilot signal by means well known in the art. Based on the C/I ratio computation, the member terminal 106 may then determine whether the minimum or threshold data rate may be supported by means also well known in the art. If the member terminal 106 determines that the minimum or threshold data rate may be supported, it may attempt to join the piconet 102 by registering with the master terminal 104.

Figure 2:
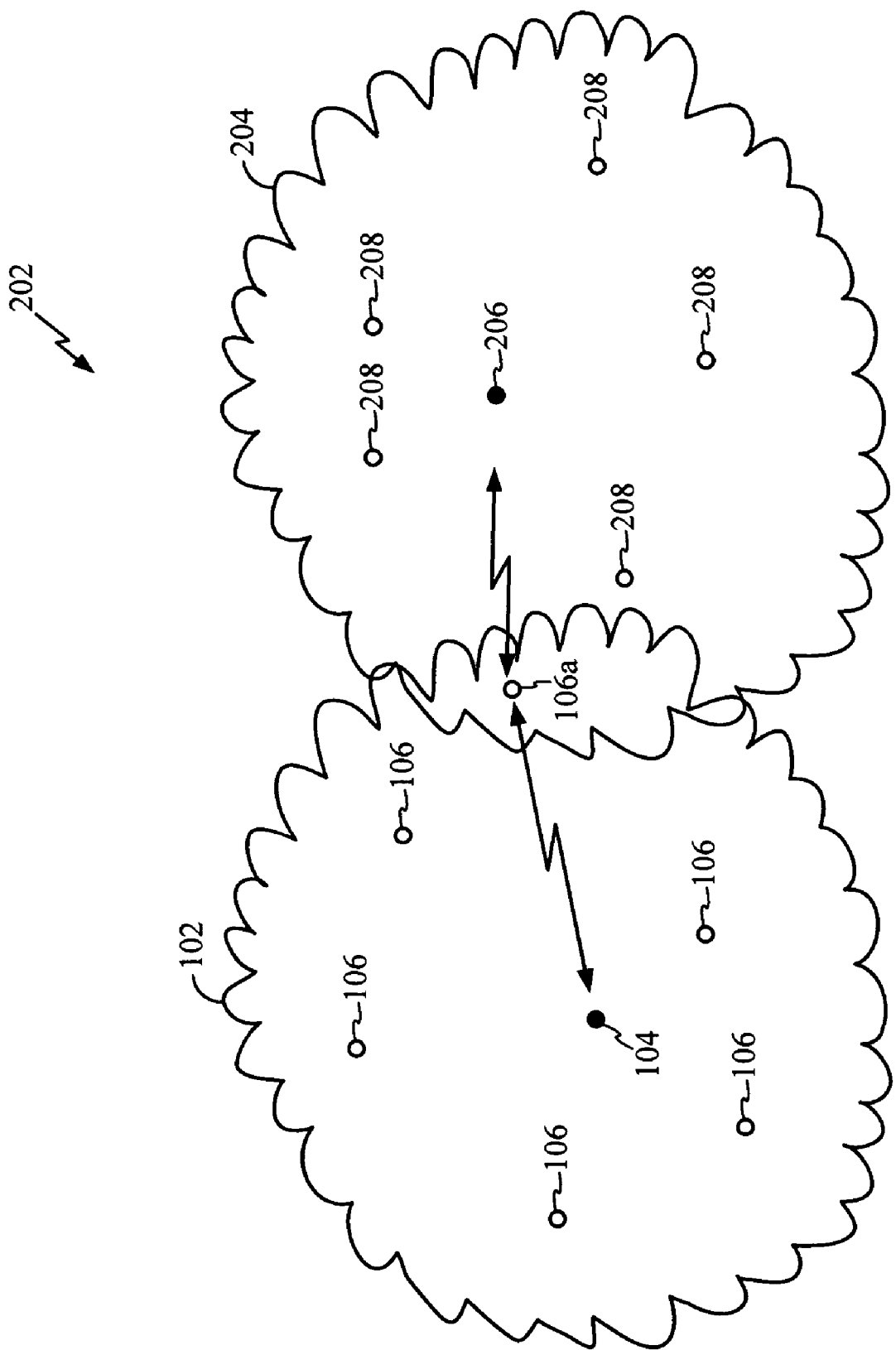
FIG. 2 is a conceptual diagram illustrating an example of two piconets forming a piconet cluster.

A member terminal that is able to communicate at the minimum or threshold data rate with two (or more) master terminals becomes an "intra-cluster bridge terminal" between the two piconets, and the two piconets become members of the same cluster. FIG. 2 is an example of a network topology illustrating a cluster 202 formed by two piconets 102 and 204. The first piconet 102 of the cluster 202 is the same piconet described in connection with FIG. 1 with its master terminal 104 supporting several member terminals 106. The second piconet 204 of the cluster 202 includes a master terminal 206 also supporting several member terminals 208. The member terminal 106a is a member of both the first and second piconets 102 and 204, and is therefore an intra-cluster bridge terminal. If there is more than one intra-cluster bridge terminal between two piconets, one of them is chosen to be the primary intra-cluster bridge and the others are secondary bridges. Communications between the terminals in the two piconets 102 and 204 may be direct, or through one of the intra-cluster bridge terminals.

In some instances, a terminal may be unable to find a pilot signal of sufficient signal strength to support the minimum or threshold data rate. This may result from any number of reasons. By way of example, the terminal may be too far from the master terminal. Alternatively, the propagation environment may be insufficient to support the requisite data rate. In either case, the terminal may be unable to join an existing piconet, and therefore, may begin operating as an isolated terminal by transmitting its own pilot signal. The isolated terminal may become the master terminal for a new piconet. Other terminals that are able to receive the pilot signal broadcast from the isolated terminal with sufficient strength may attempt to acquire that pilot signal and join the piconet of this isolated terminal.

Figure 3:
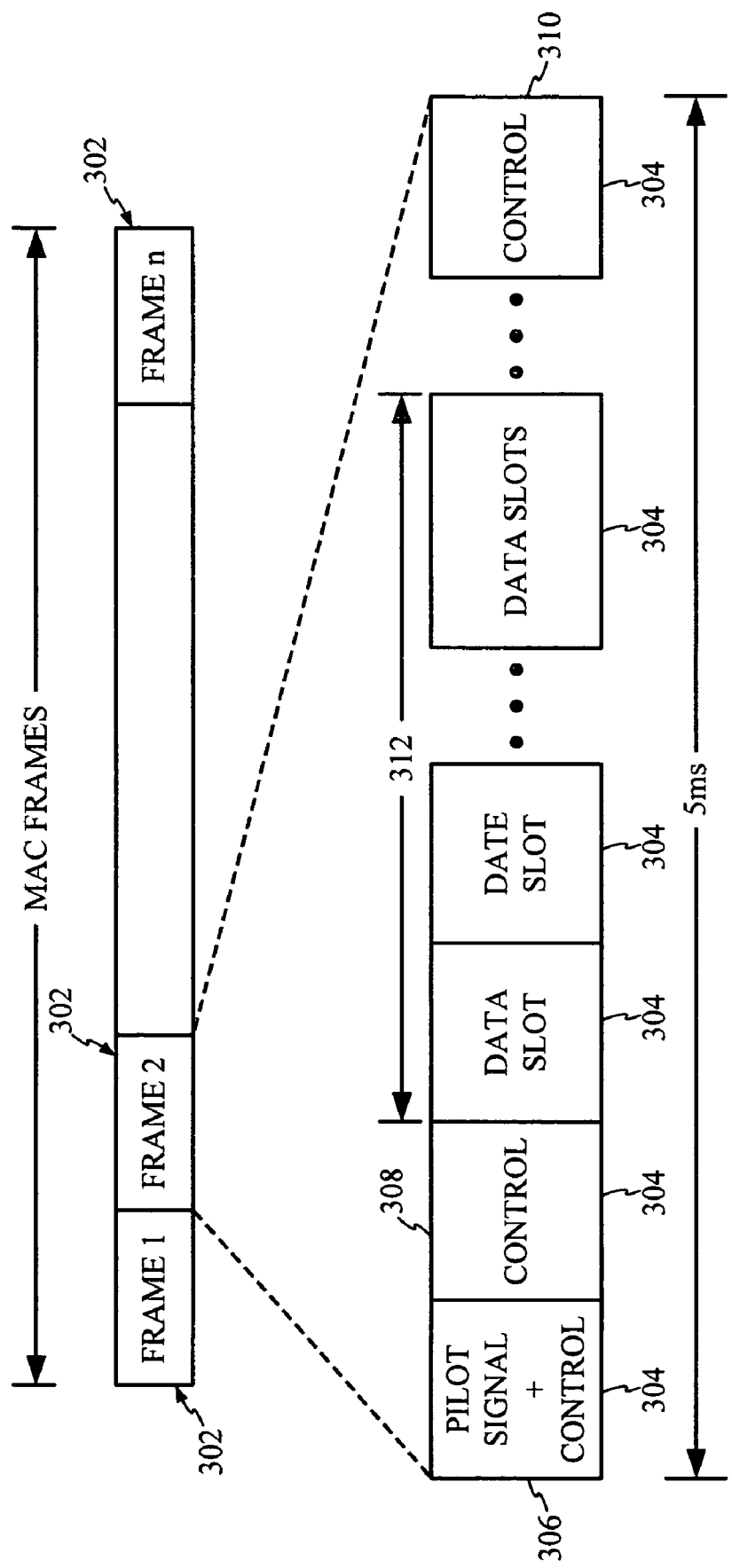
FIG. 3 is a conceptual diagram illustrating an example of a Medium Access Control (MAC) frame for controlling piconet communications.

Turning to FIG. 3, a periodic frame structure may be used to support communications between terminals. This frame is typically referred to in the art as a Medium Access Control (MAC) frame because it is used to provide access to the communications medium for the terminals. The frame may be any duration depending on the particular application and overall design constraints. For the purpose of discussion, a frame duration of 5 ms will be used. A 5 ms frame is reasonable to accommodate a high chip rate of 650 Mcps and a desire to support data rates down to 19.2 kbps.

An example of a MAC frame structure is shown with n number of frames 302. Each frame may be divided into a number of time slots 304, by way of example 160 time slots. The slot duration may be 31.25 μs, which corresponds 20,312.5 chips at 650 Mcps. Any number of time slots within the frame may be dedicated to overhead. By way of example, the first slot 306 in the frame 302 may be used by the master terminals to broadcast a spread-spectrum pilot signal. The pilot signal may occupy the entire slot 306, or alternatively, be time shared with a control channel as shown in FIG. 3. The control channel occupying the end of the first slot 306 may be a spread-spectrum signal broadcast at the same power level as the pilot signal. The master terminals may use this control channel to define the composition of the MAC frame.

Scheduling information may be broadcast using one or more additional spread-spectrum control channels which occupy various time slots within the frame, such as time slots 308 and 310 in FIG. 3. The scheduling information may include time slot assignments for each active terminal. These time slot assignments may be selected from the data slots occupying a portion 312 of the frame 302. Additional information, such as the power level and data rate for each active terminal may also be included. Multiple terminal pairs may also be assigned to any given time slot using a CDMA scheme. In this case, the scheduling information may also include the spreading codes to be used for the individual communications between terminals.

Figure 4:
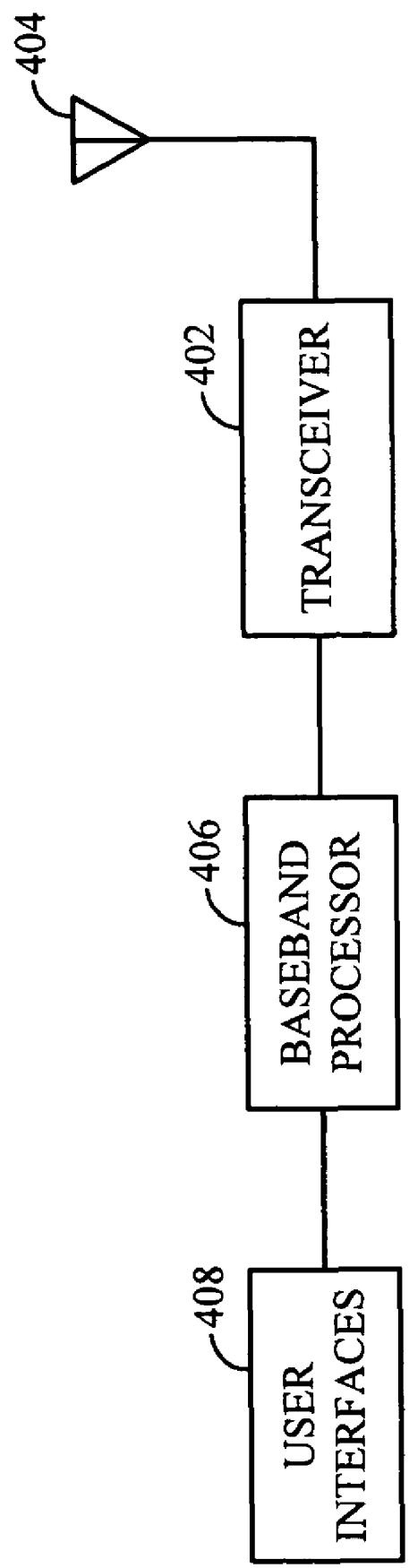
FIG. 4 is a conceptual block diagram illustrating an example of a terminal capable of operating within a piconet.

FIG. 4 is a conceptual block diagram illustrating one possible configuration of a terminal. As those skilled in the art will appreciate, the precise configuration of the terminal may vary depending on the specific application and the overall design constraints. For the purposes of clarity and completeness, the various inventive concepts will be described in the context of a UWB terminal with spread-spectrum capability, however, such inventive concepts are likewise suitable for use in various other communication devices. Accordingly any reference to a spread-spectrum UWB terminal is intended only to illustrate the various aspects of the present invention, with the understanding that such aspects have a wide range of applications.

The terminal may be implemented with a front end transceiver 402 coupled to an antenna 404. A baseband processor 406 may be coupled to the transceiver 402. The baseband processor 406 may be implemented with a software based architecture, or another type of architecture. The software based architecture may be configured with a microprocessor (not shown) that serves as a platform to run software programs that, among other things, provide executive control and overall system management functions that allow the terminal to operate either as a master or member terminal in a piconet. The baseband processor 606 may also include a digital signal processor (DSP) (not shown) with an embedded communications software layer which runs application specific algorithms to reduce the processing demands on the microprocessor. The DSP may be used to provide various signal processing functions such as pilot signal acquisition, time synchronization, frequency tracking, spread-spectrum processing, modulation and demodulation functions, and forward error correction.

The terminal may also include various user interfaces 408 coupled to the baseband processor 406. The user interfaces may include, by way of example, a keypad, mouse, touch screen, display, ringer, vibrator, audio speaker, microphone, camera and/or the like.

Figure 5:
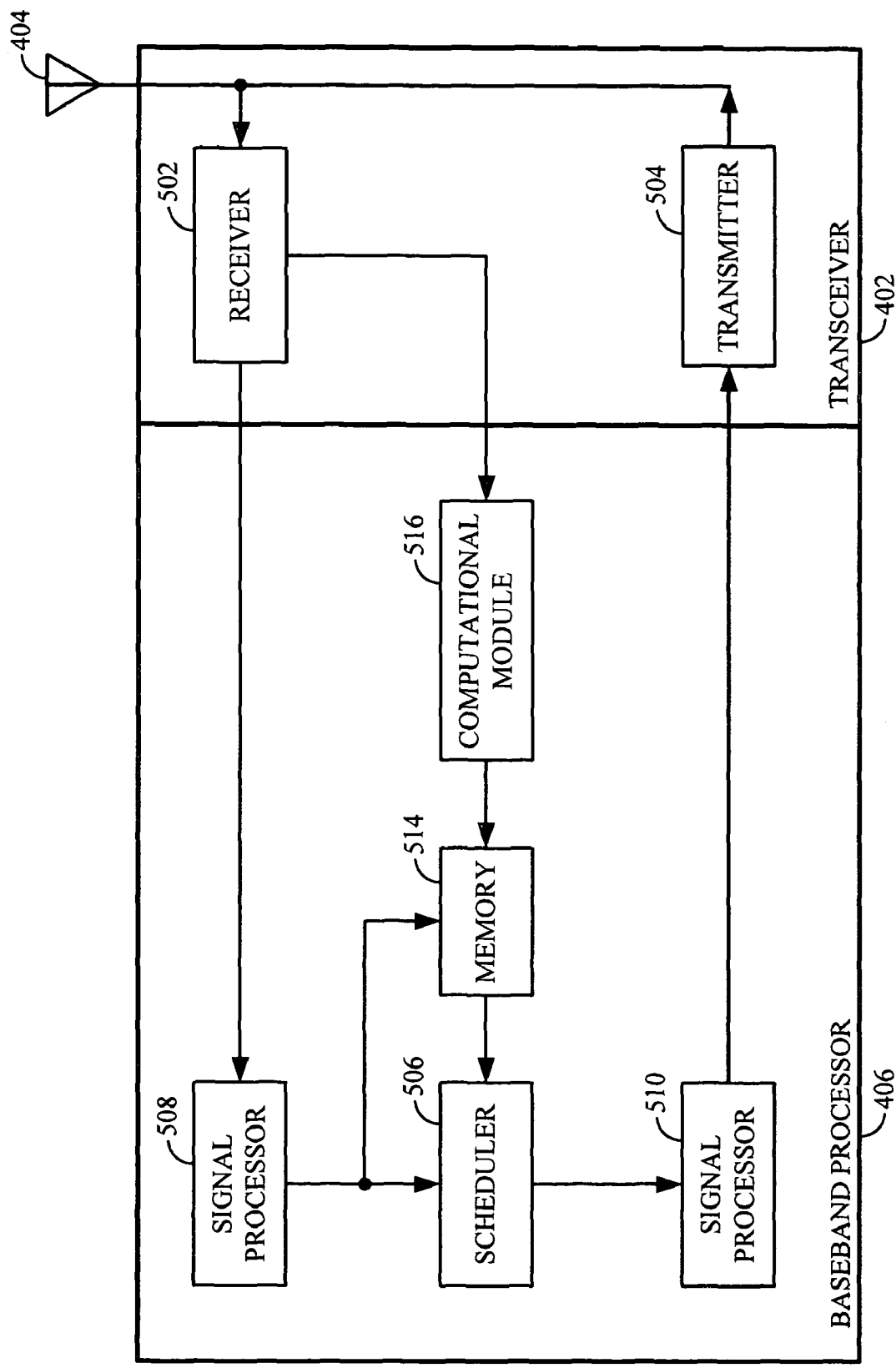
FIG. 5 is a functional block diagram illustrating an example of a transceiver and baseband processor in a terminal.

FIG. 5 is a functional block diagram illustrating an example of a baseband processor and a transceiver. The transceiver 402 may include a receiver 502 and a transmitter 504. The receiver 502 may be used to detect desired signals in the presence of noise and interference and amplify them to a level where information contained in the signal can be processed by the baseband processor 406. The transmitter 504 may be used to modulate information from the baseband processor 406 onto a carrier and amplify the modulated carrier to a sufficient power level for radiation into free space through the antenna 404.

The baseband processor 406 may include signal processors 508 and 510 on the transmitting and receiving ends of the terminal. The signal processors 508 and 510 may be used for pilot signal acquisition, time synchronization, frequency tracking, spread-spectrum processing, modulation and demodulation functions, forward error correction, and/or any other signal processor functions appropriate to support communications with other terminals. As discussed earlier, these signal processing functions may be implemented with an embedded software layer in a DSP, or alternatively, by any other means.

The baseband processor 406 may enable a scheduler 506 when operating as a master terminal. In the software based implementation of the baseband processor 406, the scheduler 506 may be a software program running on the microprocessor. However, as those skilled in the art will readily appreciate, the scheduler 506 is not limited to this embodiment, and may be implemented by other means known in the art, including a hardware configuration, firmware configuration, software configuration, or any combination thereof, which is capable of performing the various functions described herein.

During call set-up between two terminals, the scheduler 506 may be used to negotiate the call. The signal processors 508 and 510 on the transmitting and receiving end may be used to communicate with the two terminals on the appropriate control channels using spread-spectrum techniques. In this manner, the scheduler 506 may be used to determine the data rate needed to support the call through an exchange of signaling messages. The data rate selected by the scheduler 506 may be based on the type of service requested by means well known in the art. By way of example, if a member terminal initiates a call with another member terminal to support a video application, the scheduler 506 may determine that the call requires a high data rate. If another member terminal initiates a voice call to another member terminal, the scheduler 506 may select a lower data rate to support the call.

The scheduler 506 may also be used to assign a block of time slots to the two terminals during call set-up. The number of time slots assigned by the scheduler 506 may be based on variety of considerations in accordance with any scheduling algorithm. By way of example, block assignments may be made based on a priority system, where voice communications are given priority over high latency communications. The scheduler 506 may also give priority to high data rate transmissions in an effort to maximize throughput. A fairness criteria that considers the amount of data to be transferred between the two terminal may also be considered. The time slot assignments may be in block form, as described above, or scattered throughout the MAC frame. The time slot assignments may be fixed for the entire call, or may be adjusted during the call based on the current loading of the master terminal. Those skilled in the art will be readily able to adapt existing scheduling algorithms to any particular application.

The scheduler 506 may also be configured to schedule simultaneous transmissions to maximize data throughput. The scheduling of simultaneous transmissions should be done in a way that does not result in mutual interference between the receiving terminals. This may be achieved in a variety of ways. By way of example, the scheduler 506 may employ power control techniques to limit the transmission power of each terminal engaged in a simultaneous transmission to that necessary to the maintain a target quality parameter at each receiving terminal. The target quality parameter for any given receiving terminal may be the minimum C/I ratio needed to meet the Quality of Service (QoS) requirements at the scheduled data rate.

Various power control techniques that may be used by the scheduler 506 to schedule simultaneous transmissions will first be discussed in connection with intra-piconet transmissions. "Intra-piconet" transmissions refer to transmissions between two terminals in the same piconet. These concepts will then be expanded to cover transmissions across multiple piconets in the same cluster. Transmissions across multiple piconets will be referred to as "inter-piconet" transmissions.

The scheduler 506 may also set aside a number of time slots for peer-to-peer transmissions. These transmissions may require high transmit power, and in some instances, can only be sustained at low data rates. In the event that high power transmissions are needed to communicate with the isolated terminals and/or piconets outside the cluster, the scheduler 506 may decide not to schedule any other transmissions at the same time.

Figure 6:
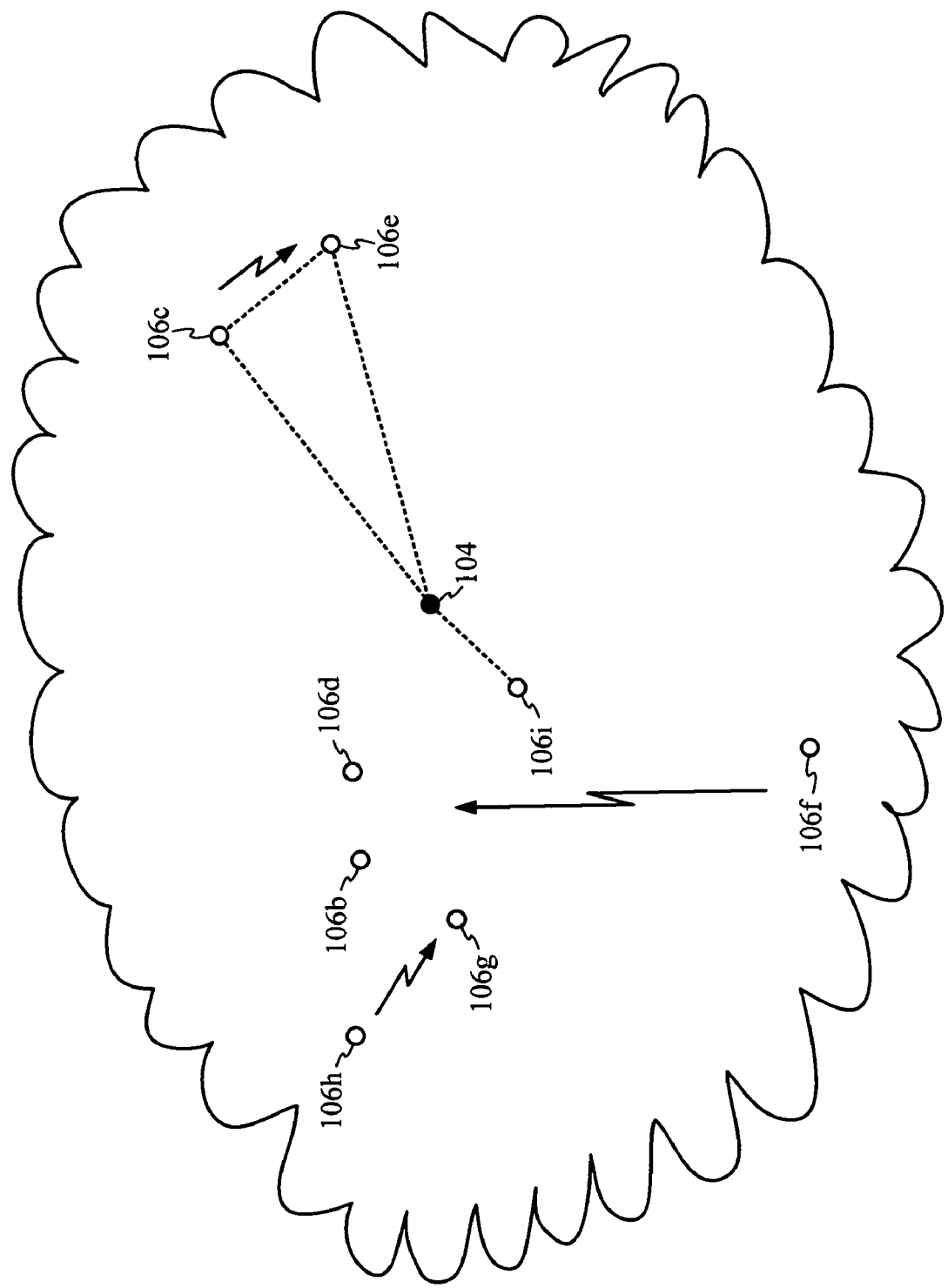
FIG. 6 is a conceptual block diagram illustrating an example of a topology map.

Assuming for the moment that the active terminals in the piconet shown in FIG. 1 are all engaged in intra-piconet communications, then the scheduler 506 may be used to schedule simultaneous transmissions in a way that satisfies a target C/I ratio for each receiving terminal. A piconet topology map may be used for this purpose. An example of a piconet topology map is shown in FIG. 6. The piconet topology map may be constructed by the master terminal from transmissions it receives from the member terminals.

Returning to FIG. 5, a computational module 516 may be used to measure the received signal strength from the member terminals during scheduled transmissions. Since the timing and power level for each member terminal transmission is controlled by the scheduler 506, the timing and power level information may be provided to the computational module 516, and together with the measured received signal strength, the scheduler 506 may be able to compute the path loss to each member terminal.

The member terminals may also be used to periodically provide the master terminal with path loss measurements to other member terminals in the piconet. These measurements may be based on scheduled transmissions between the member terminals. The path loss measurements may be transmitted to the master terminal on one or more spread-spectrum control channels. The signal processor 510 on the receiving end may be used to extract these measurements from the control channels and store them in memory 514.

Returning to FIG. 6, a series of broken lines between two terminals represents a known distance between two terminals. The distance on the map may be derived from the path loss measurements made at the master terminal, as well as those reported back to it by the member terminals. However, as will be explained in greater detail shortly, it is the measured path loss and not the distance that is used for simultaneous transmission scheduling decisions. Therefore, if the master terminal has path loss information for every possible combination of terminal pairs in the piconet, then simultaneous transmissions may be scheduled without having to know the angular coordinates of each member terminal with respect to the master terminal. As a practical matter, however, a piconet topology map with angular coordinates may prove quite useful in scheduling simultaneous transmissions.

A piconet topology map with angular coordinates may be constructed using any number of techniques including, by way of example, the Navstar Global Positioning (GPS) satellite navigation system. In this embodiment, each terminal may be equipped with a GPS receiver (not shown) which is able to compute its coordinates by means well known in the art. The coordinates for the member terminals may be transmitted to the master terminal over the appropriate spread-spectrum control channels.

Returning to FIG. 5, the signal processor 510 may be used to extract the member terminal coordinates and provide them to the scheduler 506. The scheduler 506 may use these coordinates, together with its own coordinates, to construct a piconet topology map such as the one shown in FIG. 6.

The scheduler 506 may use the piconet topology map to estimate the path loss between terminal pairs for which path loss information is not otherwise available. The path loss is a function of the distance between the terminals and the environmental conditions. Since the path loss between a number of terminals is known, and the distance between the same terminals is also known, the effect of the environmental conditions on signal propagation can be estimated by the scheduler 506. If we assume that the environmental conditions are relatively the same throughout the piconet, the scheduler 506 may be able to compute the path loss between terminals for which no path loss information is otherwise available. The results of the path loss computations may be stored in memory 514 for later use. In short range applications, such as UWB, accurate path loss estimates may be made by assuming that the environmental conditions are substantially the same throughout the piconet.

Once the piconet topology map is constructed by the scheduler 506 and the path loss information stored in memory 514, the scheduling decisions may be made. The scheduler 506 may use the information contained in the piconet topology map in conjunction with any other appropriate factors bearing on the scheduling decisions to ensure that the scheduled transmissions do not unduly interfere with one another.

Before describing a methodology for maintaining the target C/I ratio at each receiving terminal in a simultaneous transmission environment, it is illustrative to examine the impact of simultaneous transmissions in connection with FIG. 6. Assuming moderate target C/I requirements throughout the piconet, a transmission from the member terminal 106h to the member terminal 106g can probably be scheduled concurrently with a transmission from the member terminal 106c to the member terminal 106e. This scheduling decision should meet the target C/I requirements because the transmission from the member terminal 106h should not cause excessive interference at the member terminal 106e, and the transmission from the member terminal 106c should not cause excessive interference at the member terminal 106g.

A more aggressive scheduling decision might also include a transmission from the member terminal 106f to the member terminal 106b. If the target C/I requirements are low enough, this scheduling decision may not result in excessive interference. However, if the target C/I ratio at the member terminal 106g is high because of, for example, a high data rate application, then the signal power transmitted from the member terminal 106h may need to be sufficiently high that it causes excessive interference at the member terminal 106b. The interference from the member terminal 106h experienced by the member terminal 106b may reduce the actual C/I ratio below the target, thereby degrading performance to an unacceptable level. In this case, the transmission from the member terminal 106f to the member terminal 106b should be scheduled at a different time.

The scheduler may perform a computation to ensure that the target C/I ratio for each receiving terminal is maintained. The manner in which the scheduler performs this computation may vary depending on the specific application, designer preference and overall design constraints. One example will be provided below for a single time slot in the MAC frame with three simultaneous transmissions.

The three simultaneous transmissions include a transmission from the member terminal 106h to the member terminal 106g, a transmission from the member terminal 106c to the member terminal 106e, and a transmission from the member terminal 106f to the member terminal 106b. The C/I ratio (C/I$_G$) will be computed first at the member terminal 106g. The signal strength at the member terminal 106g is equal to the transmission power (P$_H$) at the member terminal 106h less the path loss (L$_{H-G}$) from the member terminal 106h to the member terminal 106g. The interference at the member terminal 106g results from the signal transmissions by the member terminals 106c and 106f, and can be represented by the transmission power (P$_C$) at the member terminal 106c less the path loss (L$_{C-G}$) from the member terminal 106c to the member terminal 106g plus the transmission power (P$_F$) at the member terminal 106f less the path loss (L$_{F-G}$) from the member terminal 106f to the member terminal 106g. Based on these relationships, the C/I ratio may be computed in the logarithmic domain by the following equation:

$$C/I_G \text{ dB} = P_H - L_{H-G} - (P_C - L_{C-G} + P_F - L_{F-G} + M) \quad (1)$$

where M is equal to an interference margin that may be used to account for out-of-piconet interference.

Two similar equations may also be used to compute the C/I ratios at the member terminal receivers 106e and 106b. The C/I ratio (C/I$_E$) at the member terminal 106e may be computed in the logarithmic domain by the following equation:

$$C/I_E \text{ dB} = P_C - L_{C-E} - (P_H - L_{H-E} + P_F - L_{F-E} + M) \quad (2)$$

where: L$_{C-E}$ is the path loss from the member terminal 106c to the member terminal 106e; L$_{H-E}$ is the path loss from the member terminal 106h to the member terminal 106e; and L$_{F-E}$ is the path loss from the member terminal 106f to the member terminal 106e. The C/I ratio (C/I$_B$) at the member terminal 106b may be computed in the logarithmic domain by the following equation:

$$C/I_B \text{ dB} = P_F - L_{F-B} - (P_H - L_{H-B} + P_C - L_{C-B} + M) \quad (3)$$

where: L$_{F-B}$ is the path loss from the member terminal 106f to the member terminal 106b; L$_{H-B}$ is the path loss from the member terminal 106h to the member terminal 106b; and L$_{C-B}$ is the path loss from the member terminal 106c to the member terminal 106b.

Substituting into equations (1)-(3), the target C/I ratio for each of the receiving terminals and the path loss information stored in memory, we are left with three equations and three unknowns, which may be solved algebraically. Assuming that all three equations can be satisfied, then the simultaneous transmissions from the member terminals 106h, 106c and 106f may be scheduled at the computed power levels. If, on the other hand, no combination of power levels can satisfy all three equations, then the three transmissions should not be scheduled simultaneously.

Figure 7:
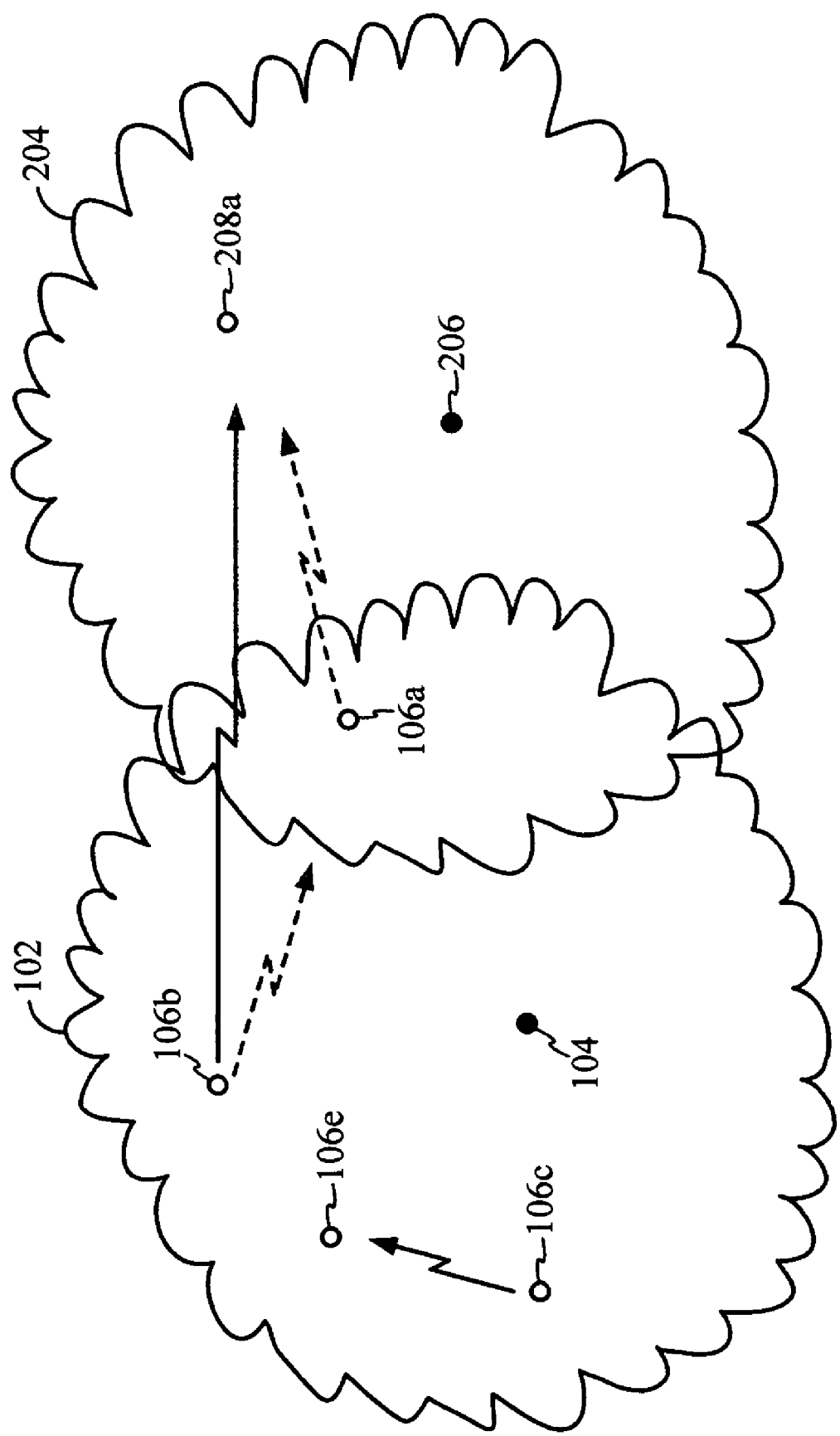
FIG. 7 is a conceptual diagram illustrating an example of inter-piconet communications.

This concept may be extended to inter-piconet transmissions. Turning to FIG. 7, a member terminal 106b in the first piconet 102 may establish a call with a member terminal 208a in the second piconet 204. When considering the piconet topology map, it would appear that a direct transmission from the member terminal 106b to the member terminal 208a should not be scheduled concurrently with the transmission from the member terminal 106c to the member terminal 106e. The transmission power at the member terminal 106b needed to overcome the path loss to the member terminal 208a would probably unduly interfere with the reception at the member terminal 106e.

As an alternative to scheduling the transmission from the member terminal 106b to the member terminal 208a at a different time, the transmission may be routed through the intra-cluster bridge terminal 106a in a multi-hop fashion. In this case, the transmission power at the member terminal 106b may be reduced to accommodate the shorter distance transmission to the intra-cluster bridge terminal 106a. This reduction in transmission power at the member terminal 106b translates into an increase in C/I ratio at the member terminal 106e.

The second leg of the transmission from the intra-cluster bridge terminal 106a to the member terminal 208a can probably be scheduled concurrently with the transmission from the member terminal 106c to the member terminal 106e in the next MAC frame. This is because the transmission power at the intra-cluster bridge terminal 106a needed to overcome the path loss to the member terminal 208a is less than the transmission power needed for a direct transmission between the member terminals 106b and 208a. Moreover, the intra-cluster bridge terminal 106a is further away from the member terminal 106e than the member terminal 106b, and therefore, less likely to interfere with the reception at the member terminal 106e.

In at least one embodiment of a piconet cluster, the master terminal 104 in the first piconet 102 is responsible for scheduling transmissions from the member terminal 106b to the member terminal 208a. The master terminal 206 in the second piconet 204 is responsible for scheduling transmissions in the reverse direction. The manner in which the master terminals schedule their respective inter-piconet transmissions may be the same, and therefore, only scheduling decisions in connection with a transmission from the first piconet 102 to the second piconet 204 will be discussed. These decisions include scheduling the power level for the inter-piconet transmission from the member terminal 106b to the member terminal 208a, whether it be a direct transmission or a multi-hop transmission through the intra-cluster bridge terminal 106a. The power level of the return transmission may be the same or different, and the determination as to whether the return transmission is direct or multi-hop may be independent of the manner in which the transmission from the member terminal 106b was routed.

Whether the scheduler in the master terminal 104 in the first piconet 102 schedules a direct transmission between the member terminals 106b and 208a, or routes the transmission through the intra-cluster bridge terminal 106a, may be a function of path loss between the two member terminals 106b and 208a. The path loss information, however, may not be included in the topology map because the receiving terminal is outside the piconet. As a practical matter, it may be inefficient in terms of overhead to require each master terminal construct a topology map of all terminals within the cluster, although this is certainly a possibility and well within the realm of the present invention. A more efficient approach may be to dynamically add to the topology map terminals outside the piconet that are in communication with a member terminal within the piconet. The manner in which terminals outside the piconet may be added and dropped from the topology map may vary depending on the particular application and the overall design constraints. One example will be discussed below.

When the member terminal 106b wishes to place a call to the member terminal 208a outside its piconet, it signals the master terminal 104. Using the intra-cluster bridge terminal 106a, the master terminal 104 may query one or more other master terminals within the cluster to find the member terminal 208a. In this case, the master terminal 104 sends a query through the intra-cluster bridge terminal 106a to the master terminal 206. The master terminal 206 responds to the query indicating that the member piconet 208a is in the second piconet 204.

Accompanying the response may be path loss information between the member terminal 208a and the intra-cluster bridge terminal 106a. Path loss information between the member terminal 208a and any secondary intra-cluster bridge terminals (not shown) may also be included with the response. Since both the member terminal 208a and all intra-cluster bridge terminals are members of the second piconet 204, this path loss information may be provided from the topology map maintained by the master terminal 206 in the second piconet 204. This path loss information may be added to the topology map of the master terminal 104 in the first piconet to support multi-hop transmissions across the two piconets.

The master terminal 104 in the first piconet 102 may also send back to the master terminal 206 in the second piconet 204 information relating to the path loss between the member terminal 106b and the intra-cluster bridge terminal 106a. Path loss information between the member terminal 106b and any secondary intra-cluster bridge terminals (not shown) may also be included. Since both the member terminal 106b and all intra-cluster bridge terminals are members of the first piconet 102, this path loss information may be provided from the topology map maintained by the master terminal 104 in the first piconet 102. This path loss information may be added to the topology map of the master terminal 206 in the second piconet to support multi-hop transmissions across the two piconets.

The master terminals 104 and 206 may also need to obtain path loss information between the member terminal 106b and the member terminal 208a to support direct communications. This information may be obtained during call set-up. More specifically, each member terminal 106b and 208a may compute the path loss from a pilot signal embedded in signaling messages by means well known in the art. The computed path loss information may be reported from the member terminals 106b and 208a to their respective master terminals 104 and 206. The topology map maintained at each master terminal 104 and 206 may then be updated accordingly.

When determining whether to schedule an inter-piconet transmission as a direct transmission or a multi-hop transmission through an intra-cluster bridge terminal, the scheduler may use information in the piconet topology map to maximize throughput. By way of example, the scheduler may schedule a direct transmission if the target C/I ratio at each receiving terminal in the first piconet 102 can be maintained with a direct transmission. If the power level of a direct transmission causes the target C/I ratio at one or more receiving terminals in the first piconet 102 to be surpassed, then a different block of time slots may be assigned to the direct inter-piconet transmission. Alternatively, the inter-piconet transmission may be routed through the intra-cluster bridge terminal 106a, thus reducing the transmission power required by the member terminal 106b. The target C/I ratio for each receiving terminal in the first piconet 102 should still be checked to ensure that the multi-hop transmission does not cause excessive interference.

In the case of a direct inter-piconet transmission, the scheduler in the master terminal 104 of the first piconet 102 may be used to ensure that the transmission power is adequate to meet the target C/I ratio at the receiving terminal 208a. This may be determined in a number of ways. By way of example, a high power transmission may be used with a high spreading factor and a low data rate so that the signal can be decoded at the receiving terminal 208b even in the presence of interference originating within the second piconet 204. The high power transmission, however, may cause excessive interference within the first piconet 102, and thereby limit the number of simultaneous transmissions that can take place.

Alternatively, the two piconets may coordinate the inter-piconet transmission. During call set-up between the two terminals 106b and 208a, the scheduler in the master terminal 104 may be used to determine the data rate needed to support the call based on the type of service requested. A target quality parameter for the receiving terminal 208a may then be selected by the master terminal 104. The target quality parameter may be a target C/I ratio, or any other target quality parameter. In at least one embodiment, the target quality parameter may be the minimum C/I ratio (i.e., target C/I ratio) needed to meet the QoS requirements at the determined data rate.

Once the target quality parameter is determined for the receiving terminal 208a, a block of time slots may be assigned to support the call by the scheduler in the master terminal 104. As described in greater detail earlier, the assignment of time slots should be made in a way that preserves the target C/I ratio for each receiving terminal in the first piconet 102. This will depend on the transmission power ($P_{106b}$) required at the member terminal 106a, which can be represented by the following equation:

$$P_{106b} \, dB = C/I_{208a} + L_{106b\text{-}208a} + I + M \tag{4}$$

where: $C/I_{208a}$ is the target C/I ratio at the receiving terminal 208a; $L_{106b\text{-}208a}$ is the path loss from the transmitting terminal 106b in the first piconet 102 to the receiving terminal 208a in the second piconet;

I is the intra-piconet interference at the receiving terminal 208a in the second piconet 204; and M is equal to an interference margin that may be used to account for out-of-piconet interference.

In at least one embodiment, the master terminal 206 in the second piconet 204 may elect not to schedule any transmissions during the inter-piconet transmission from the member terminal 106b to the member terminal 208a. In this embodiment, the time slot assignments for the inter-piconet transmission may be transmitted from the master terminal 104 in the first piconet 102 to the master terminal 206 in the second piconet 204 through the intra-cluster bridge terminal 106a. These time slot assignments become constraints in the scheduling algorithm for the second piconet 204, and are unavailable for scheduling intra-piconet transmissions within the second piconet 204. As a result, the variable "I" in equation (4) can be set to zero, and the transmission power ($P_{106b}$) may be computed by the scheduler of the master terminal 104 in the first piconet.

In another embodiment, the scheduler in the master terminal 206 of the second piconet 204 may schedule intra-piconet transmissions simultaneously with the inter-piconet transmission. In this embodiment, the variable "I" in equation (4) will have a non-zero value, and therefore, increase the transmission power ($P_{106b}$) required at the member terminal 106a to meet the target C/I ratio ($C/I_{208a}$) at the member terminal 208a.

Figure 8:
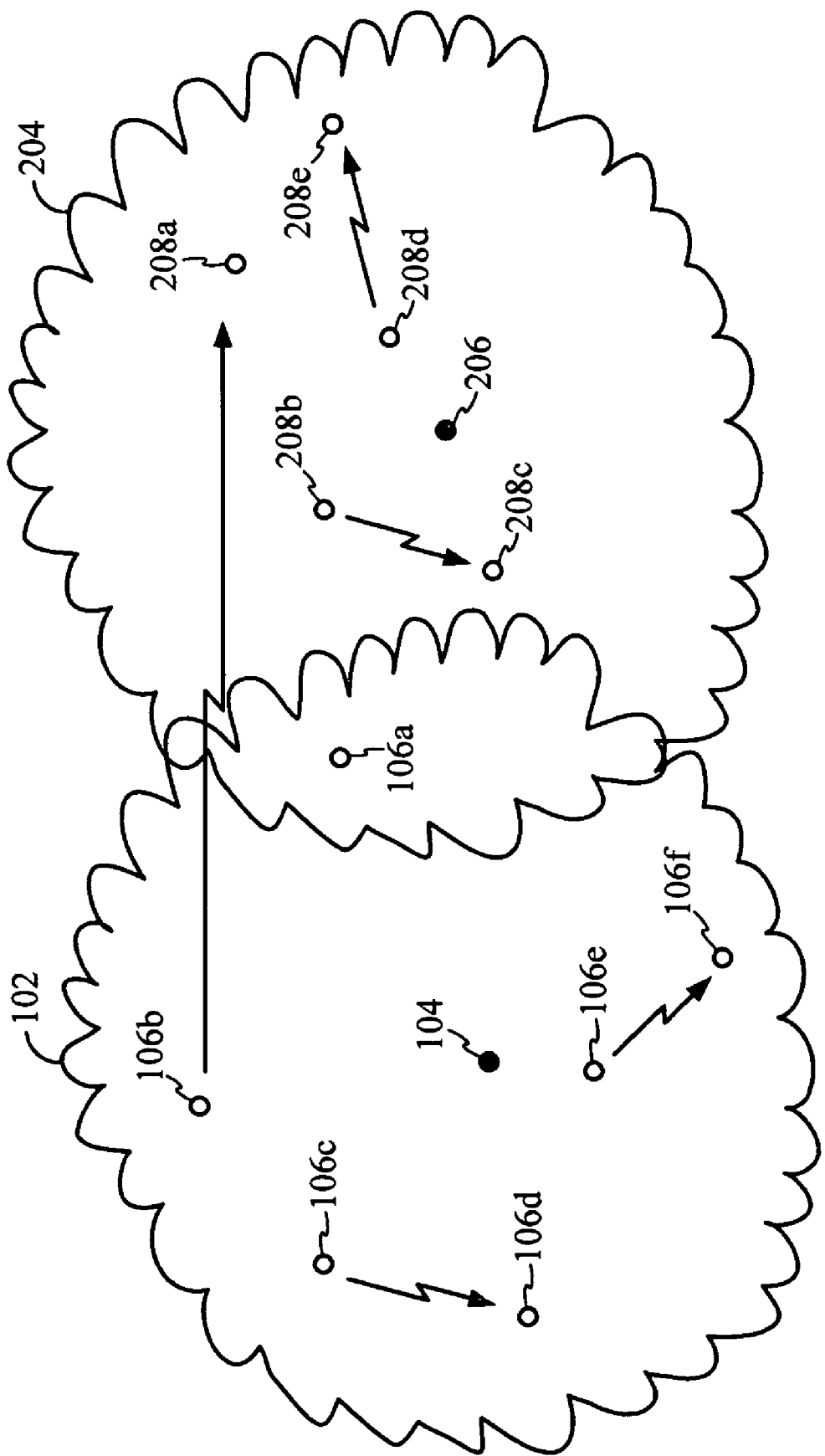
FIG. 8 is a conceptual block diagram illustrating another example of inter-piconet communications.

Turning to FIG. 8, two intra-piconet transmissions with the second piconet 204 are shown simultaneously with the inter-piconet transmission. The two intra-piconet transmissions include a transmission from member terminal 208b to member terminal 208c, and a transmission from member terminal 208d to member terminal 208e. A scheduling algorithm may be used to limit the power of each transmission to that necessary to meet the target C/I ratio at each receiving terminal in the second piconet 204. In a manner similar to that described in connection with equations (1)-(3), the scheduler in the master terminal 206 of the second piconet 204 may algebraically solve the following equations:

$$C/I_{208c} \, dB = P_{208b} - L_{208b\text{-}208c} - (P_{208d} - L_{208d\text{-}208c} + P_{106b} - L_{106b\text{-}208c} + M) \tag{5}$$

$$C/I_{208e} \, dB = P_{208d} - L_{208d\text{-}208e} - (P_{208b} - L_{208b\text{-}208e} + P_{106b} - L_{106b\text{-}208e} + M) \tag{6}$$

$$C/I_{208a} \, dB = P_{106b} - L_{106b\text{-}208a} - (P_{208b} - L_{208b\text{-}208a} + P_{106d} - L_{106d\text{-}208a} + M) \tag{7}$$

where for any given transmission for terminal x to terminal y:
$C/I_y$ is the target C/I ratio at terminal y;
$P_x$ is the scheduled power level for terminal x;
$L_{x\text{-}y}$ is the path loss from terminal x to terminal y; and
$P_z$ is the scheduled power level for terminal z (i.e., a source of interference at terminal y);
$L_{z\text{-}y}$ is the path loss from terminal z to terminal y.

The target C/I ratio ($C/I_{208a}$) for the member terminal 208a may be forwarded to the master terminal 206 in the second piconet 204 from the master terminal 104 in the first piconet. The path loss information ($L_{106b\text{-}208a}$) between the member terminal 106b and the member terminal 208a was computed by the master terminal 206 during call set-up. The remaining values for the target C/I ratio and the path loss may be obtained from the computational module and memory in the master terminal 206 in the same manner described earlier in connection with intra-piconet transmissions within the first piconet 102.

Once the target C/I ratio for each receiving terminal in the second piconet 204 and the path loss information is substituted into equations (5)-(7), the power levels may be computed. Assuming that all three equations can be satisfied, then the computed power level ($P_{106b}$) for the member terminal 106b in the first piconet 102 may be transmitted to the master terminal 104 in the first piconet via the intra-cluster bridge terminal 106a. The scheduler in the master terminal 104 of the first piconet 102 may then schedule one or more intra-piconet transmissions simultaneous with the inter-piconet transmission. By way of example, the scheduler in the master terminal of the first piconet 102 may schedule simultaneously with the inter-piconet transmission, a transmission between member terminals 106c and 106d and a transmission between member terminals 106e and 106f. The power levels may be scheduled by algebraically solving the following equations:

$$C/I_{106d} \, dB = P_{106c} - L_{106c\text{-}106d} - (P_{106e} - L_{106e\text{-}106d} + P_{106b} - L_{106b\text{-}106d} + M) \tag{8}$$

$$C/I_{106f} \, dB = P_{106e} - L_{106e\text{-}106f} - (P_{106c} - L_{106c\text{-}106f} + P_{106b} - L_{106b\text{-}106f} + M) \tag{9}$$

where for any given transmission for terminal x to terminal y:
$C/I_y$ is the target C/I ratio at terminal y;
$P_x$ is the scheduled power level for terminal x;
$L_{x\text{-}y}$ is the path loss from terminal x to terminal y; and
$P_z$ is the scheduled power level for terminal z (i.e., a source of interference at terminal y;
$L_{x\text{-}y}$ is the path loss from terminal z to terminal y.

All the variables in equations (8) and (9) are known except the power levels for the transmitting terminals 106c and 106e, and therefore, we are left with two equations and two unknowns.

In the event that the scheduler in the master terminal 104 for the first piconet 102 determines that no combination of power levels can satisfy equations (8) and (9), or if any of the required power levels exceed the maximum transmit power of one or more terminals, then the scheduler may reassign one or more intra-piconet transmissions to another block of time slots. Alternatively, the scheduler may decide to route the inter-piconet transmission through the intra-cluster bridge terminal 106a. The scheduling decisions in connection with this multi-hop transmission should include the process of confirming that all target C/I ratios in both piconets 102 and 204 can be met during the relevant time slots.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the terminal, or elsewhere. In the alternative, the processor and the storage medium may reside as discrete components in the terminal, or elsewhere.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of scheduling communications, comprising:
   scheduling an inter-piconet transmission between first transmitting and receiving terminals including scheduling a power level for the inter-piconet transmission that satisfies a target quality parameter at the first receiving terminal; and
   scheduling an intra-piconet transmission between second transmitting and receiving terminals, including scheduling a power level for the intra-piconet transmission that satisfies a target quality parameter at the second receiving terminal, the intra-piconet transmission being scheduled simultaneously with the inter-piconet transmission.

2. The method of claim 1 further comprising transmitting the schedule for the inter-piconet transmission to the first transmitting terminal, and transmitting the schedule for the intra-piconet transmission to the second transmitting terminal.

3. The method of claim 1 wherein the quality parameter comprises a carrier-to-interference ratio.

4. The method of claim 1 wherein the first transmitting terminal and the second transmitting and receiving terminals are members of a first piconet, and the first receiving terminal is a member of a second piconet.

5. The method of claim 1 wherein the first transmitting terminal and the second transmitting and receiving terminals are members of a first piconet, and the first receiving terminal is a member of the first piconet and a second piconet.

6. The method of claim 5 wherein the inter-piconet transmission comprises information, the information being destined for a third terminal, the third terminal being a member of the second piconet, but not a member of the first piconet, the method further comprising scheduling a transmission of the information from the first receiving terminal to the third terminal.

7. The method of claim 1 further comprising receiving information relating to path loss between the first transmitting and receiving terminals, the scheduled power level for the inter-piconet transmission being a function of the information.

8. The method of claim 1 wherein the first transmitting terminal and the second transmitting and receiving terminals are members of a first piconet, and the first receiving terminal is a member of a second piconet, the method further comprising transmitting the inter-piconet transmission schedule to a third terminal in the second piconet, the third terminal being responsible for scheduling intra-piconet transmissions in the second piconet.

9. The method of claim 1 further comprising assigning a first spreading code to the inter-piconet transmission, and a second spreading code to the intra-piconet transmission, the first spreading code being different from the second spreading code.

10. A method of scheduling communications, comprising:
    receiving in a first piconet timing information relating to a scheduled inter-piconet transmission from a first transmitting terminal in a second piconet to a first receiving terminal in the first piconet;
    scheduling an intra-piconet transmission between second transmitting and receiving terminals in the first piconet simultaneously with the inter-piconet transmission;
    scheduling a power level for the inter-piconet transmission that satisfies a target quality parameter at the first receiving terminal; and
    scheduling a power level for the intra-piconet transmission that satisfies a target quality parameter at the second receiving terminal.

11. The method of claim 10 further comprising transmitting the scheduled power level for the inter-piconet transmission to a third terminal in the second piconet, the third terminal being responsible for scheduling intra-piconet transmissions in the second piconet.

12. A communications terminal, comprising:
    a scheduler configured to schedule an inter-piconet transmission between first transmitting and receiving terminals including scheduling a power level for the inter-piconet transmission that satisfies a target quality parameter at the first receiving terminal, the scheduler further being configured to schedule an intra-piconet transmission between second transmitting and receiving terminals including scheduling a power level for the intra-piconet transmission that satisfies a target quality parameter at the second receiving terminal, the intra-piconet transmission being scheduled simultaneous with the inter-piconet transmission.

13. The communications terminal of claim 12 further comprising a transmitter configured to transmit the schedule of the inter-piconet transmission to the first transmitting terminal, and transmit the schedule of the of intra-piconet transmission to the second transmitting terminal.

14. The communications terminal of claim 13 further comprising a transceiver having the transmitter, and a user interface configured to allow a user to engage in communications with another terminal through the transceiver.

15. The communications terminal of claim 14 wherein the user interface comprises a keypad, a display, a speaker and a microphone.

16. The communications terminal of claim 12 wherein the quality parameter comprises a carrier-to-interference ratio.

17. The communications terminal of claim 12 wherein the first transmitting terminal and the second transmitting and receiving terminals are members of a first piconet, and the first receiving terminal is a member of a second piconet.

18. The communications terminal of claim 12 wherein the first transmitting terminal and the second transmitting and receiving terminals are members of a first piconet, and the first receiving terminal is a member of the first piconet and a second piconet.

19. The communications terminal of claim 18 wherein the inter-piconet transmission comprises information, the information being destined for a third terminal, the third terminal being a member of the second piconet, but riot a member of the first piconet, the scheduler being further configured to schedule a transmission of the information from the first receiving terminal to the third terminal.

20. The communications terminal of claim 12 further comprising a receiver configured to receive information relating to path loss between the first transmitting and receiving terminals, the scheduled power level for the inter-piconet transmission being a function of the information.

21. The communications terminal of claim 12 wherein the first transmitting terminal and the second transmitting and receiving terminals are members of a first piconet, and the first receiving terminal is a member of a second piconet, the communications terminal further comprising a transmitter configured to transmit the inter-piconet transmission schedule to a third terminal in the second piconet, the third terminal being responsible for scheduling intra-piconet transmissions in the second piconet.

22. The communications terminal of claim 12 further comprising a processor configured to assign a first spreading code to the inter-piconet transmission and a second spreading code to the intra-piconet transmission, the first spreading code being different from the second spreading code.

23. A communications terminal operable in a first piconet, comprising:
a receiver configured to receive timing information relating to a scheduled inter-piconet transmission from a first transmitting terminal in a second piconet to a first receiving terminal in the first piconet; and
a scheduler configured to schedule an intra-piconet transmission between second transmitting and receiving terminals in the first piconet simultaneously with the inter-piconet transmission, the scheduler being further configured to schedule a power level for the inter-piconet transmission that satisfies a target quality parameter at the first receiving terminal, and schedule a power level for the intra-piconet transmission that satisfies a target quality parameter at the second receiving terminal.

24. The communications terminal of claim 23 further comprising a transmitter configured to transmit the scheduled power level for the inter-piconet transmission to a third terminal in the second piconet, the third terminal being responsible for scheduling intra-piconet transmissions in the second piconet.

25. A communications terminal, comprising:
means for scheduling an inter-piconet transmission between first transmitting and receiving terminals including scheduling a power level for the inter-piconet transmission that satisfies a target quality parameter at the first receiving terminal; and
means for scheduling an intra-piconet transmission between second transmitting and receiving terminals, including scheduling a power level for the intra-piconet transmission that satisfies a target quality parameter at the second receiving terminal, the intra-piconet transmission being scheduled simultaneous with the inter-piconet transmission.

* * * * *